(12) United States Patent
Dubugnon et al.

(10) Patent No.: US 11,219,110 B2
(45) Date of Patent: Jan. 4, 2022

(54) SYSTEM AND METHOD FOR MANAGING A LIGHTING OF A ZONE OF INTEREST COMPRISING AT LEAST ONE OBJECT LIABLE TO BE MANIPULATED BY A USER

(71) Applicant: ETA SA Manufacture Horlogere Suisse, Grenchen (CH)

(72) Inventors: Dominique Dubugnon, Saint-Prex (CH); Cédric Blatter, Commugny (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 17/002,916

(22) Filed: Aug. 26, 2020

(65) Prior Publication Data

US 2021/0092820 A1 Mar. 25, 2021

(30) Foreign Application Priority Data

Sep. 25, 2019 (EP) ..................... 19199642

(51) Int. Cl.
| | |
|---|---|
| *H05B 47/10* | (2020.01) |
| *H05B 47/125* | (2020.01) |
| *H05B 47/16* | (2020.01) |
| *H05B 47/165* | (2020.01) |

(52) U.S. Cl.
CPC ........... *H05B 47/125* (2020.01); *H05B 47/16* (2020.01); *H05B 47/165* (2020.01)

(58) Field of Classification Search
CPC ...... H05B 45/12; H05B 45/20; H05B 45/325; H05B 47/115; H05B 47/135; H05B 47/125; H05B 47/165
See application file for complete search history.

(56) References Cited

U.S. PATENT DOCUMENTS

| | | | |
|---|---|---|---|
| 10,816,939 B1 * | 10/2020 | Coleman | ................. G01S 17/86 |
| 2006/0170924 A1 | 8/2006 | Budd et al. | |
| 2015/0091593 A1 | 4/2015 | Zhu et al. | |

(Continued)

FOREIGN PATENT DOCUMENTS

WO WO 2016/055843 A1 4/2016

OTHER PUBLICATIONS

European Search Report dated Mar. 18, 2020 in European Application 19199642.0 filed Sep. 25, 2019 (with English Translation of Categories of Cited Documents), 3 pages.

*Primary Examiner* — Tung X Le
(74) *Attorney, Agent, or Firm* — Oblon, McClelland, Maier & Neustadt, L.L.P.

(57) ABSTRACT

A method for managing a lighting of a zone of interest including at least one object liable to be manipulated by a user, the lighting being carried out by a main lighting device and a secondary lighting device both provided with electroluminescent elements, the method including identifying the user and/or the object; configuring the lighting of the zone of interest according to the profile of the identified user relative to vision and/or at least one characteristic of the identified object, the step including generating an instruction for controlling the lighting properties of the main lighting device and/or of the secondary lighting device according to criteria of visual perception of the object by the user; controlling the main lighting device and/or the secondary lighting device according to the instruction for controlling the lighting properties.

18 Claims, 3 Drawing Sheets

(56) References Cited

U.S. PATENT DOCUMENTS

| | | |
|---|---|---|
| 2016/0363576 A1 | 12/2016 | Zhu et al. |
| 2017/0290934 A1* | 10/2017 | Dobrinsky .......... G02B 19/0095 |
| 2018/0117189 A1* | 5/2018 | Yadav ....................... A61L 2/24 |
| 2018/0167547 A1* | 6/2018 | Casey ................. G06K 9/00771 |
| 2018/0195972 A1 | 7/2018 | Roeckle et al. |
| 2018/0221521 A1* | 8/2018 | Shur .......................... A61L 2/00 |
| 2019/0056584 A1 | 2/2019 | Davidi et al. |
| 2019/0114941 A1* | 4/2019 | Shimaoka .......... G09B 19/0092 |
| 2019/0120812 A1 | 4/2019 | Zhu et al. |
| 2019/0121522 A1* | 4/2019 | Davis ................. G06F 3/04815 |
| 2019/0137406 A1 | 5/2019 | Zhu et al. |

* cited by examiner

SYSTEM AND METHOD FOR MANAGING A LIGHTING OF A ZONE OF INTEREST COMPRISING AT LEAST ONE OBJECT LIABLE TO BE MANIPULATED BY A USER

CROSS-REFERENCE TO RELATED APPLICATION

This application claims priority to European Patent Application No. 19199642.0 filed on Sep. 25, 2019, the entire disclosure of which is hereby incorporated herein by reference.

TECHNICAL FIELD

The invention relates to a method for managing a lighting of a zone of interest comprised in a working environment of a user, the zone of interest comprising at least one object liable to be manipulated by this user, as well as a system implementing this method.

The invention relates to a room of a building comprising such a system.

TECHNOLOGICAL BACKGROUND

In the prior art such methods for managing a lighting are in particular implemented in the context of processes of visual examination of parts for a possible identification of defects in the latter. Such methods conventionally provide control of a lighting device aiming to ensure adapted lighting of a zone of interest comprising the parts to be examined. During this control, the adapted lighting of this zone of interest can consist of the generation by this lighting device of an invisible light that generates a fluorescence that is capable of bringing to light the existence of defects revealed by the emission of a visible fluorescent light by a colourant of a penetrating composition previously applied onto said part and which has been retained in the cracks or fissures of the latter.

However, such methods are not adapted to participate in such processes of visual examination since they are often the cause of great fatigue on the part of the users in charge of checking these parts, thus engendering a loss of concentration of said users and therefore a risk of errors.

There is therefore a need to propose a solution contributing to creating optimised lighting of such a zone of interest.

SUMMARY OF THE INVENTION

One goal of the invention is therefore to propose a method that allows to improve the lighting of a zone of interest using a lighting of this zone that is controlled dynamically and automatically.

The invention relates to a method for managing a lighting of a zone of interest including at least one object liable to be manipulated by a user, said lighting being carried out by a main lighting device and a secondary lighting device both provided with electroluminescent elements, the method comprising the following steps:
identifying said user and/or the object;
configuring the lighting of the zone of interest according to the profile of the identified user relative to vision and/or at least one characteristic of the identified object, said step comprising the following substeps:
generating an instruction for controlling the lighting properties of the main lighting device and/or of the secondary lighting device according to criteria of visual perception of the object by the user;
controlling the main lighting device and/or said secondary lighting device according to said instruction for controlling the lighting properties.

Thus such features of the invention allow to adapt in a precise manner the lighting of this object according to the specific visual perception of the user and the task to be performed by the latter relative to the object for example such as a task relating to a process of visual examination of this object for a possible identification of a defect.

In other embodiments:
the substep of generation comprises a phase of evaluation of the visual perception criteria on the basis of vision-profile data relative to the identified user and/or data on characteristics relative to the identified object;
the substep of generation comprises a phase of determination of a configuration of the lighting properties of the main lighting device and/or of the secondary lighting device according to these visual perception criteria;
the substep of control comprises a phase of modification of the lighting properties of the main and secondary lighting devices according to said control instruction;
the method comprises a step of re-evaluating these criteria of visual perception of the object by the user including a substep of identifying a state of fatigue and/or a visual difficulty of the user capable of altering their visual perception of the object;
the step of re-evaluation comprises a substep of correcting the visual perception criteria if a state of fatigue and/or a visual difficulty of the user is identified;
the lighting properties of the main and secondary lighting devices comprise:
a light spectrum of each electroluminescent element forming each of these lighting devices;
an intensity/amplitude of the light radiation of each electroluminescent element forming each of these lighting devices;
an orientation and/or a diffusion of the light radiation produced by all of the electroluminescent elements forming each of these lighting devices.

The invention also relates to a system for managing a lighting of a zone of interest including at least one object liable to be manipulated by a user implementing the method according to any one of the preceding claims, comprising:
a main lighting device and a secondary lighting device capable of carrying out said lighting and which are both provided with electroluminescent elements, and
a processing unit connected to devices for identifying the users and the objects as well as to a database comprising data on vision profile of users, data on characteristics of objects and data for identification of users and of objects.

In other embodiments:
the main lighting device comprises a first lighting module and/or a second lighting module both provided:
with a plurality of electroluminescent elements, or
with a single electroluminescent element which is coupled to a modulator;
the first lighting module is arranged above the zone of interest in particular as close as possible to this zone and the second lighting module is defined entirely or partly around the zone of interest;
the main lighting device comprises a panel having properties of reflectance of the light radiation coming from the first lighting module towards the zone of interest;

the main lighting device comprises a panel having properties of diffusion in such a way that light radiation coming from the second lighting module passes through it;

the panel is defined entirely or partly around the zone of interest in particular between this zone of interest and the second lighting module;

a device for surveillance of the head of the users and a device for measuring the luminance perceptible by the eye of the users;

said at least one object is an horological component;

the secondary lighting device is arranged above the main device.

The invention also relates to a room of a building comprising this system.

The invention also relates to a computer program comprising program code instructions for the execution of the steps of this method when said program is executed by a processing unit.

BRIEF DESCRIPTION OF THE DRAWINGS

The invention will be described below in a more detailed manner using the appended drawings, given as examples that are in no way limiting, in which.

DETAILED DESCRIPTION OF THE INVENTION

Figure 1:
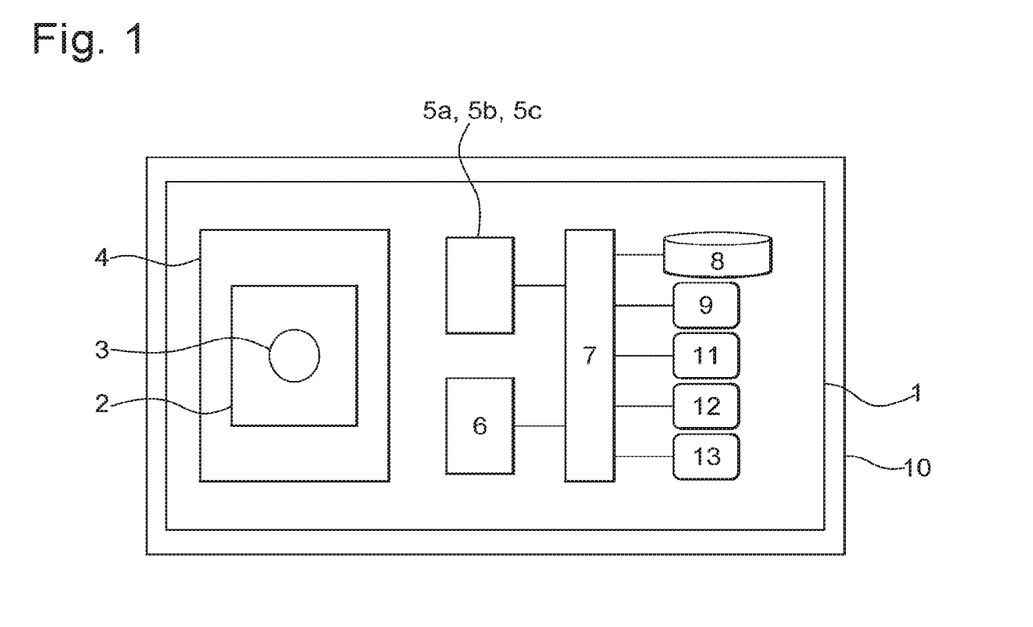
FIG. 1 is a diagram of a room of a building comprising a system for managing a lighting of a zone of interest comprised in a working environment of a user, the zone of interest comprising at least one object liable to be manipulated by this user, according to an embodiment of the invention.

FIG. 1 shows a system 1 for managing a lighting of a zone of interest 2, comprised in a working environment of a user. This working environment comprising the system 1 is preferably defined in a room 10 of a building. In other words, in this room the only light sources are comprised in the present system 1 or there can be in this room a light source such as daylight which is more or less diffuse. Such a working environment includes a support element 4 such as a desk or a workbench, formed by a top, in particular rectangular, provided to support at least one object 3 comprised in the zone of interest 2 of this working environment. Such an object 3 is in a non-limiting and non-exhaustive manner:

a component of an horological movement such as a plate, a bridge, a wheel, a spring, a mass, or a component of horological external parts, such as a bottom, a clasp, a bezel, a dial, an aperture dial index;

a timepiece such as a watch;

a piece of jewelry.

Such a system 1 contributes to the user carrying out with the naked eye the detection of functional, structural or aesthetic defects of the object 3 comprised in the zone of interest 2 of their working environment. In other words, this user carries out such a detection or identification of a defect using the visual perception that they have of this object 3. This visual perception can be defined as being the result of the interpretation that the brain of this user makes of a piece of information relative to this object 3 and which is comprised in light radiation sensed by photoreception and entering through their pupils so as to activate their receptor cells which are located in the retinae of their eyes. The signals produced by these cells being then transmitted by the optical nerve to the brain.

As previously mentioned, this zone of interest 2 can comprise at least one object 3 liable to be manipulated by the user. In this system 1, such a zone of interest 2 can be:

a space defined on the top of the supporting element 4 when the object 3 is placed on this top and thus occupies a portion of the surface of this top, or a volume defined above this top and in which this object 3 is comprised when it is manipulated by the user.

Such a zone of interest 2 is capable of taking advantage of a particular lighting carried out according to the vision profile of the user and/or at least one characteristic of the object 3.

Such a system 1 for managing the lighting of the zone of interest 2 comprises a main lighting device 5a, 5b, 5c and a secondary lighting device 6 each provided with a plurality of electroluminescent elements. In one alternative each lighting device 5a, 5b, 5c, 6 can comprise a single electroluminescent element which is coupled to a modulator. In this context, this modulator is capable of modifying the light spectrum of this diode as well as the intensity/amplitude, the orientation and/or the degree of directivity and/or the diffusion of the light radiation of this diode. A electroluminescent element comprises a light-emitting diode and also in one alternative a microlens or other optical means. It is noted in one alternative that an electroluminescent element can be devoid of such a diode.

Figure 2:
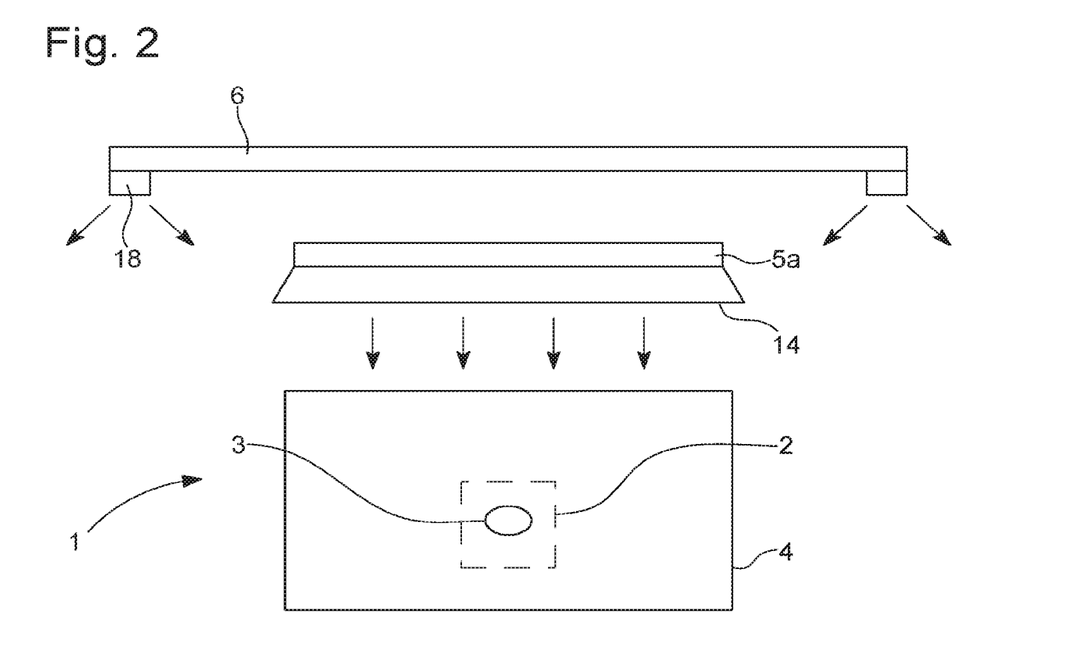
FIG. 2 shows elements forming the system comprising a first alternative of the main lighting device comprising only a first lighting module, according to the embodiment of the invention.
Figure 3:
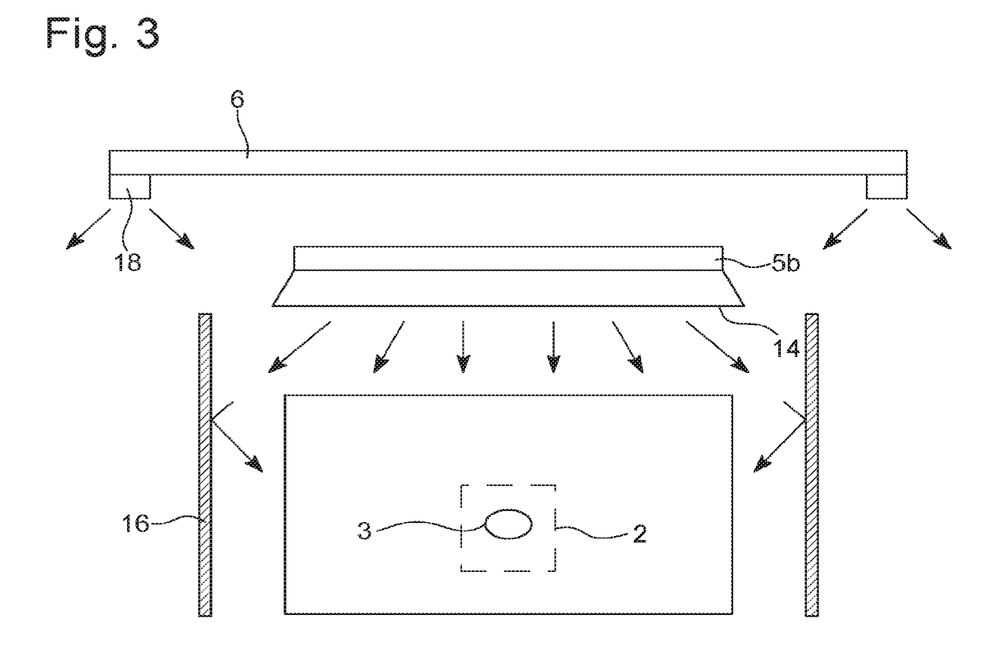
FIG. 3 shows the elements forming the system comprising a second alternative of the main lighting device comprising only the first lighting module and a panel having properties of reflectance, according to the embodiment of the invention.
Figure 4:
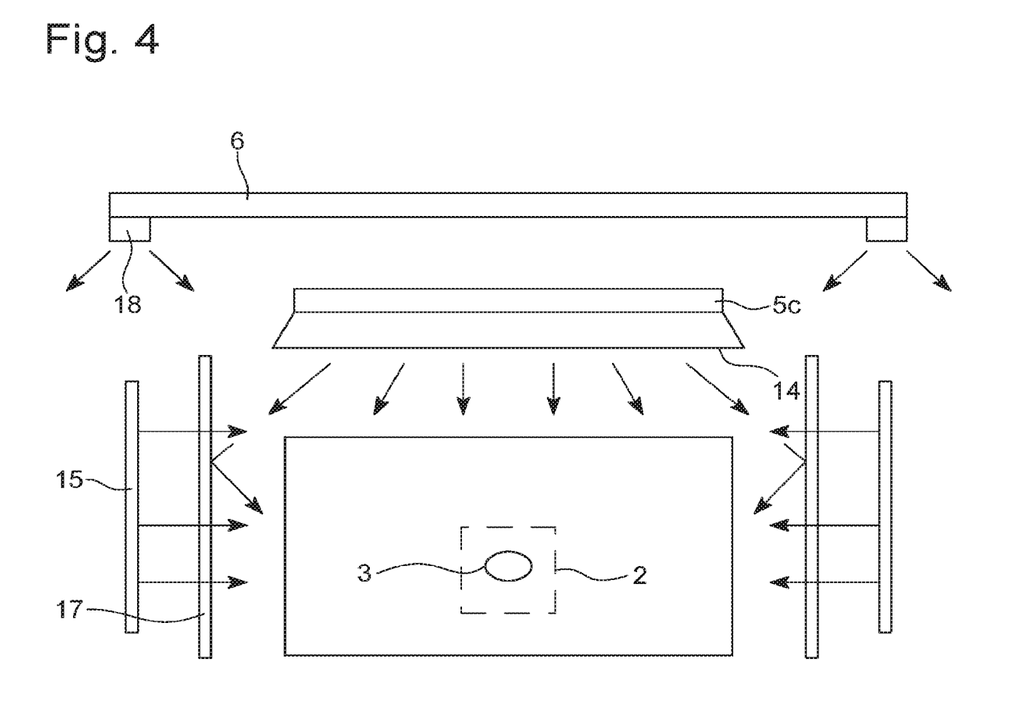
FIG. 4 shows the elements forming the system comprising a third alternative of the main lighting device comprising only the first lighting module and a second lighting module as well as a panel having properties of reflectance and of diffusion, according to an embodiment of the invention.

FIGS. 2 to 4 describe three alternatives of this main lighting device 5a, 5b, 5c. In a first alternative illustrated in FIG. 2 the main lighting device 5a comprises a single lighting module 14 named hereinafter "first lighting module". This first lighting module 14 is arranged above the top of the supporting element 4 and in particular above the zone of interest 2 and thus the object 3 comprised in this zone 2.

In a second alternative shown in FIG. 3, the main lighting device 5b comprises the first lighting module 14 arranged above the top of the supporting element 4, and a panel 16 having properties of reflectance of the light radiation coming from the first lighting module 14 towards the zone of interest 2. In this configuration, the panel 16 is defined entirely or partly around both the first lighting module 14 and the top of the supporting element 4. This panel 16 extends vertically in terms of height, from the horizontal top of the supporting element 4 to an outer edge of a peripheral wall of the first lighting module 14. It is understood that a passage is arranged in this panel 16 in order for the user to be able to visually or physically have access to the object 3 liable to be placed on the top, in order to be able to optionally manipulate it. In the context of physical access, the opening allowing this passage can be permanent or limited in time with in the latter case the panel 16 mounted to slide or to rotate in this system in order to momentarily create such an opening. With regard to visual access, an opening optionally provided with a filter can be arranged to allow the observation of the object, wherein the filter can be polarised and also spectrally, spatially and temporally modulable.

In a third alternative shown in FIG. 4, the main lighting device 5c comprises the first lighting module 14 arranged above the top of the supporting element 4 as well as a second lighting module 15 and a panel 17. This panel 17 is defined entirely or partly around both the first lighting module 14 and the top of the supporting element 4. Such a panel 17 extends vertically in terms of height, from the horizontal top of the supporting element 4 to an outer edge of the peripheral wall of the first lighting module 14. With regard to the second lighting module 15, it is defined entirely or partly around this panel 17 and extends vertically while being comprised between the heights measured with respect to the ground of the horizontal top and of the peripheral wall of the first lighting module 14. In this configuration, the panel 17 has:
  properties of reflectance of the light radiation coming from the first lighting module 14 towards the zone of interest 2, and
  properties of diffusion in such a way that light radiation coming from the second lighting module 15 passes through it.

In this third alternative of the main lighting device 5c, it is understood that a passage is arranged in this panel 17 and in the second lighting module 15 in order for the user to be able to visually or physically have access to the object 3, liable to be placed on the top, in order to be able to optionally manipulate it. In the context of physical access, the opening allowing this passage can be permanent or limited in time with in the latter case the panel 17 and the second lighting module 15 mounted to slide or to rotate in this system in order to momentarily create such an opening. With regard to visual access, an opening optionally provided with a filter can be arranged to allow the observation of the object, wherein the filter can be polarised and also spectrally, spatially and temporally modulable.

As for the secondary lighting device 6, it comprises a lighting module 18 arranged at a height measured starting from the level of the ground that is greater than that of the first lighting module 14 of the main lighting device 5a, 5b, 5c. This lighting module 18 of the secondary lighting device 6 is located above a peripheral zone of the top of the supporting element 4 and thus the zone of interest 2 comprising the object 3. This lighting module 18 generates homogenous lighting in the environment of the top.

These two lighting devices are controlled by a processing unit 7 of the system 1. This processing unit 7 which can be a computer comprises hardware and software resources in particular at least one processor cooperating with memory elements. This processing unit 7 is capable of executing instructions for the implementation of a computer program in order to ensure the management of the lighting of the zone of interest 2.

The system 1 also comprises a database 8 to which the processing unit 7 is connected. This database 8 comprises in particular:
  data on vision profile of the users comprising physiological and biological data of the users having a role in visual perception;
  data on characteristics of objects, relative to the physical, chemical, aesthetic, functional and structural characteristics of this object 3;
  data for identification of the users;
  data for identification of the objects.

It is noted that the physiological and biological data can be relative:
  to age;
  to the gender of the user,
  to characteristics of the ocular system (sensitivity to glare), and
  to characteristics of the nervous system of the user;
  to characteristics of resistance and/or of visual endurance.

It is noted that this physiological and biological data of the users takes into account:
  the period of the day for example to take into account the circadian rhythm relative to the user,
  the date and the year of when the user uses the system;
  the geolocation of the system and thus of the room comprising the system,
  the spectrum and the intensity of the daylight in the case in which the room in which the system is located is bathed in such a light, and
  the characteristics of visual photobiological security comprising for example the standards/safeties relative to a time of visual exposure related to a wavelength of light.

Moreover, with regard to the data for identification of the objects, it is noted that it can comprise data on two-dimensional or three-dimensional representation of these objects describing in particular the shape, the dimensions and/or the aesthetic aspect of each object 3 as well as data relative to the nature of the material forming this object 3. This data can also comprise informational data of the two-dimensional or three-dimensional barcode type which can be present on the object 3.

Such a system 1 also comprises:
  a device 9 for identification of the users of the system 1 provided to participate in the implementation of an identification or authentication of the user on the basis of technologies well known from the prior art, relative to a biometric authentication or to radio authentication, on the basis of the data for identification of users archived in the database 8;
  a device 11 for identification of objects implementing systems for capturing at least one image, associated with algorithms for digital processing of images. Such a device participates in the identification of the objects 3 on the basis of the data for identification of objects archived in the database 8;
  a device for surveillance of the head 12 of the users comprising systems for capturing at least one image, associated with algorithms for digital processing of images as well as an oculometer or pupillometer, this device is capable of:
    determining movements and positions of the head of the individual;
    interpreting particular expressions of the face of the users;
    identifying changes in expression of the face of the users;
    measuring and recording the eye movements of the users by determining for example the direction or the orientation of the gaze of the user relative to the object 3.

a device for measuring the luminance 13 of the object 3, perceptible by the eye of the users. This device thus comprises a luminance meter, a pupillometer and an oculometer.

Such a system can also comprise a device for measuring physiological and/or biological parameters of the user. To do this the device can include for example a bracelet worn by the user provided with activity sensors such as a heart sensor, a detector of movement or a geolocation sensor. Such a device generates data that is capable of being transmitted to the processing unit.

In this system 1, the processing unit 7 is connected to the devices 9, 11 for identification of the users and of the objects, to the device for surveillance of the head 12 of the users, to the device for measuring the luminance 13 as well as to a device for measuring physiological and/or biological parameters.

Figure 5:
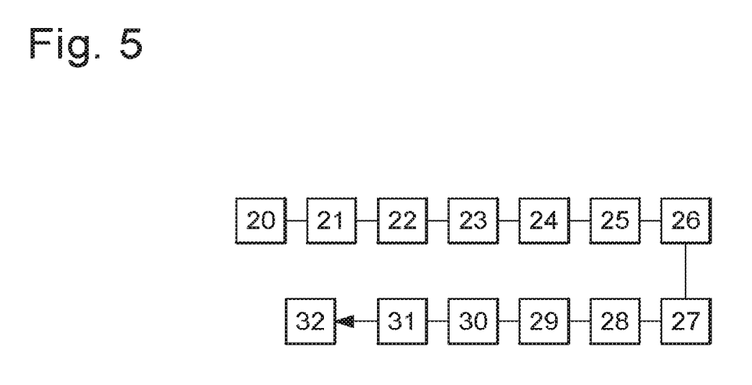
FIG. 5 shows a flowchart relative to a method for managing a lighting of a zone of interest of a working environment of a user, the zone of interest comprising at least one object liable to be manipulated by this user, according to an embodiment of the invention.

In reference to FIG. 5, such a system 1 is provided to implement a method for managing the lighting of the zone of interest 2 comprising said at least one object 3 liable to be manipulated by the user, said lighting being carried out by the main lighting device 5*a*, 5*b*, 5*c* and the secondary lighting device 6.

This method comprises a step 20 of identifying the user and/or the object 3. Such a step 20, according to the configuration chosen for the operation of this method, aims to identify only the user or only the object 3, or the user and the object 3. In this context, the identification of the user is thus carried out by the processing unit 7 and the authentication device as well as on the basis of the user authentication data archived in the database 8 of the system 1. Likewise, the identification of the object 3 is carried out using this processing unit 7 which cooperates with the device 11 for identification of objects, by using to do this the data for identification of objects archived in this server.

Once the user and/or the object 3 have been identified, the method comprises a step 21 of configuring the lighting of the zone of interest 2 according to the profile of the identified user relative to vision and/or at least one characteristic of the identified object 3. This step of configuration 21 comprises a substep 22 of generating an instruction for controlling the lighting properties of the main lighting device 5*a*, 5*b*, 5*c* and/or of the secondary lighting device 6 according to criteria of visual perception of the object 3 by the user. The lighting properties of the main and secondary lighting devices comprise:
- the light spectrum of each light-emitting diode forming each of these lighting devices;
- the intensity/amplitude of the light radiation of each light-emitting diode forming each of these lighting devices;
- the orientation and/or the degree of directivity and/or the diffusion of the light radiation produced by all of the light-emitting diodes forming each of these lighting devices, for example such as an integrating sphere.

In this method, the substep 22 of generation comprises a phase of evaluation 23 of the criteria of visual perception on the basis of the vision-profile data relative to the identified user and/or the data on characteristics relative to the identified object 3. Such visual perception criteria can thus be evaluated only on the basis of the data on vision profile of the identified user or only on the basis of the data on characteristics relative to the identified object 3 or only on the basis of the vision-profile data and the data on characteristics when the user and the object 3 have both been identified. These visual perception criteria aim to characterise/quantify an optimal visual perception of the user according, when they have been identified, to their profile data such as the physiological and biological data, and to the data on characteristics of the object 3 when the latter has been identified.

The substep 22 of generation then comprises a phase of determination 24 of a configuration of the lighting properties of the main lighting device 5*a*, 5*b*, 5*c* and/or of the secondary lighting device 6 according to these visual perception criteria. Then, the processing unit 7 produces on the basis of the configuration thus determined the instruction for controlling the lighting properties of the main lighting device 5*a*, 5*b*, 5*c* and/or of the secondary lighting device 6.

This configuration step 21 then provides a substep 25 of controlling the main lighting device 5*a*, 5*b*, 5*c* and/or the secondary lighting device 6 according to the instruction for controlling the lighting properties. During the carrying out of this substep 25, the processing unit 7 executes the previously generated instruction for controlling the lighting properties of the main lighting device 5*a*, 5*b*, 5*c* and/or of the secondary lighting device 6. Such a substep 25 comprises a phase of modification 26 of the following lighting properties of the main and secondary lighting devices 5*a*, 5*b*, 5*c*, 6 according to said control instruction:
- of the light spectrum and/or of the intensity/amplitude of the light radiation of all or a part of the light-emitting diodes of the main lighting device 5*a*, 5*b*, 5*c* and/or of the secondary lighting device 6;
- of the orientation and/or the degree of directivity and/or the diffusion of the light radiation emanating from the main lighting device 5*a*, 5*b*, 5*c* and/or from the secondary lighting device 6 for example on the basis of:
  - the selective turning off or the selective turning on of light-emitting diodes of the main lighting device 5*a*, 5*b*, 5*c* and/or of the secondary lighting device 6, or
  - the orientation of the light radiation of the main device and/or of the secondary lighting device 6, the diodes of which are each provided for example with a microlens or other optical means.

The method also comprises a step 27 of re-evaluating the criteria of visual perception of the object 3 by the user. Such a step 27 comprises a substep 28 of identifying a state of fatigue and/or a visual difficulty of the user capable of altering the visual perception by this user of the object 3. Such a state of fatigue and/or of visual difficulty can for example engender or be the cause of a loss of attention or of a lack or of a loss of concentration of this user. In this context, a state of fatigue of the user or a visual difficulty can be caused by a lighting of the zone of interest 2 and more particularly of the object 3 that is not adapted. In the context of the implementation of this substep 28, the processing unit 7 carries out a processing of the data, accordingly, that it receives from the following devices:
- the device for surveillance of the head 12 of the user;
- the device for measuring the luminance 13 resulting from a part of a surface of the object 3 onto which the gaze of the user falls or is set;
- the device for measuring physiological and/or biological parameters of the user.

In this context, the surveillance device transmits data such as an image or a sequence of images or a video of the face of the user on the basis of which data the processing unit 7 carries out a digital processing allowing for example to detect a particular expression of this face such as a blinking of an eyelid indicating a state of fatigue or a visual difficulty by a furrowed brow. With regard to the device for measuring the luminance 13, it transmits to the processing unit 7 data on measurement of luminance relative to the part of the surface of the object 3 onto which the gaze of the user falls or is set, and determines for example according to a luminance reference value whether the measurement(s) carried out reveal a visual difficulty of the user caused by a lighting of the zone of interest 2 and more particularly of this part of the surface of the object 3 which is not adapted. With regard to the device for measuring physiological and/or biological parameters of the user, it transmits to the processing unit data on measurement of the physiological and/or biological state of the user.

This step of re-evaluation 27 also comprises a substep 29 of correcting visual perception criteria if a state of fatigue and/or a visual difficulty of the user are identified. Such a substep 29 comprises a phase of the processing unit 7 carrying out operations of calculation aiming to modify the values of these visual perception criteria on the basis of a correction index characterising the level of the state of fatigue and/or of visual difficulty of the user which was detected during the substep 28 of identification.

Such a step 27 of re-evaluation is executed periodically, according to:
- a predefined time interval that can be configured;
- a detection of a change in direction/in orientation of the gaze of the user relative to the object 3;
- a detection of a manipulation of the object 3;
- a detection of a movement of the object 3;
- a detection of a change in at least one optical property of the object 3;
- a detection of an observation by the user of a new part of the surface of the object 3;
- a detection of a variation of at least one physiological and biological parameter of the user.

The method comprises after this step 27 of re-evaluation a step 30 of configuring a lighting of the zone of interest 2 according to the re-evaluated visual perception criteria. This configuration step 30 comprises a substep 31 of generating a new instruction for controlling the lighting properties of the main lighting device 5a, 5b, 5c and/or of the secondary lighting device 6 according to these re-evaluated visual perception criteria of the user. Then this step 30 comprises a substep 32 of controlling the main lighting device 5a, 5b, 5c and/or the secondary lighting device 6 according to the new instruction for controlling the lighting properties. During the carrying out of this step 30, the processing unit 7 executes this previously generated new instruction for controlling the lighting properties of the main lighting device 5a, 5b, 5c and/or of the secondary lighting device 6.

Moreover, the invention relates to a computer program comprising program code instructions for the execution of steps 20 to 27 of this method when said program is executed by the processing unit 7 of the system 1.

The invention also relates to a room 10 of a building comprising such a system 1.

The invention claimed is:

1. A method for managing a lighting of a zone of interest comprising at least one object liable to be manipulated by a user, said lighting being carried out by a main lighting device and a secondary lighting device both provided with electroluminescent elements, the method comprising the following steps:
   identifying said user and/or the object;
   configuring the lighting of the zone of interest according profile of the identified user relative to vision and/or at least one characteristic of the identified object, said configuring comprising the following substeps:
   generating an instruction for controlling lighting properties of the main lighting device and/or of the secondary lighting device according to the profile based on criteria of visual perception of the object by the user and information obtained by sensors; and
   controlling the main lighting device and/or said secondary lighting device according to said instruction for controlling the lighting properties.

2. The method according to claim 1, wherein a substep of generation comprises a phase of evaluation of the visual perception criteria on a basis of vision-profile data relative to the identified user and/or data on characteristics relative to the identified object.

3. The method according to claim 1, wherein a substep of generation comprises a phase of determination of a configuration of the lighting properties of the main lighting device and/or of the secondary lighting device according to these visual perception criteria.

4. The method according to claim 1, wherein a substep of control comprises a phase of modification of the lighting properties of the main and secondary lighting devices according to said control instruction.

5. The method according to claim 1, further comprising a step of re-evaluating said criteria of visual perception of the object by the user including a substep of identifying a state of fatigue and/or a visual difficulty of the user capable of altering their visual perception of the object.

6. The method according to claim 1, wherein a step of re-evaluation comprises a substep of correcting the visual perception criteria if a state of fatigue and/or a visual difficulty of the user is identified.

7. The method according to claim 1, wherein the lighting properties of the main and secondary lighting devices comprise:
   a light spectrum of each electroluminescent element forming each of the lighting devices;
   an intensity/amplitude of light radiation of each electroluminescent element forming each of the lighting devices; and
   an orientation and/or a diffusion of the light radiation produced by all of the electroluminescent elements forming each of the lighting devices.

8. A system for managing Tall the lighting of the zone of interest comprising at least one object liable to be manipulated by the user implementing the method according to claim 1, comprising:
   the main lighting device and the secondary lighting device capable of carrying out said lighting and which are both provided with electroluminescent elements, and
   a processor connected to devices for identifying the users and the objects and connected to a database comprising data on vision profile of users, data on characteristics of objects and data for identification of users and of objects.

9. The system according to claim 8, wherein the main lighting device comprises a first lighting module and/or a second lighting module both provided:
   with a plurality of electroluminescent elements, or
   with a single electroluminescent element which is coupled to a modulator.

10. The system according to claim 8, wherein a first lighting module is arranged above the zone of interest in particular as possible close to said zone and a second lighting module is defined entirely or partly around the zone of interest.

11. The system according to claim 8, wherein the main lighting device comprises a panel having properties of reflectance of light radiation coining from a first lighting module towards the zone of interest.

12. The system according to claim 8, wherein the main lighting device comprises a panel having properties of diffusion in such a way that light radiation coming from a second lighting module passes through said panel.

13. The system according to claim 8, wherein the main lighting device comprises a panel defined entirely or partly around the zone of interest between said zone of interest and a second lighting module.

14. The system according to claim 8, further comprising a device for surveillance of a head of the users and a device for measuring luminance perceptible by eyes of the users.

15. The system according to claim 8, wherein said at least one object is a horological component.

16. The system according to claim 8, wherein the secondary lighting device is arranged above the main device.

17. A room of a building comprising the system according to claim 8.

18. A non-transitory computer program comprising program code instructions for execution of the steps of the method according to claim 1 when said program is executed by a processor.

\* \* \* \* \*

UNITED STATES PATENT AND TRADEMARK OFFICE
CERTIFICATE OF CORRECTION

PATENT NO. : 11,219,110 B2
APPLICATION NO. : 17/002916
DATED : January 4, 2022
INVENTOR(S) : Dubugnon et al.

It is certified that error appears in the above-identified patent and that said Letters Patent is hereby corrected as shown below:

In the Claims

In Column 9, Claim 1, Line 63, insert --to a-- before "profile".

Signed and Sealed this
Seventh Day of June, 2022

*Katherine Kelly Vidal*

Katherine Kelly Vidal
*Director of the United States Patent and Trademark Office*